UNITED STATES PATENT OFFICE 2,339,769

SYNTHETIC CONDENSATION PRODUCT

Gaetano F. D'Alelio, Pittsfield, Mass., assignor to General Electric Company, a corporation of New York No Drawing. Application August 30, 1941, Serial No. 409,019

12 Claims. (Cl. 260—42)

This invention is concerned with the production of new and useful synthetic condensation products. More particularly, it relates to synthetic products derived from novel starting materials containing amino, amido, and imino linkages. Specifically, it is concerned with and has as its principal object the preparation of resinous compositions obtained by condensation reactions involving certain novel di-monocarbinolureidomethyl amines, including substituted di-(monocarbinolureidomethyl) amines and substituted and unsubstituted di-(monocarbinolthioureidomethyl) amines, of the general formula

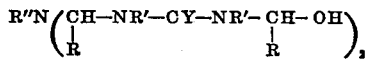

wherein Y represents oxygen or sulphur, R represents hydrogen or a monovalent aliphatic, carbocyclic or aromatic hydrocarbon radical of not more than six carbon atoms and R' and R'' represent either hydrogen or any monovalent hydrocarbon or halo-hydrocarbon radical, whether saturated or unsaturated, aliphatic, alicyclic, aromatic or heterocyclic, mono- or poly-nuclear, etc.

A further object of the invention is to provide materials which may be incorporated into and reacted with other resins and resin-forming materials. Another object of this invention is to provide a class of organic compounds which may be used as catalytic reactants in the preparation of resins depending on condensation reactions, or as curing reactants for resins obtained through condensation reactions. Still other objects of the invention will appear as the description of the invention proceeds.

The preformed di-(monocarbinolureidomethyl) amines represented by the above formula and containing both carbinol (—CHROH) and ureido (—NR'—CO—NR'—) (or thioureido—NR'—CS—NR'—) groupings may suitably be prepared by reacting, in the cold, a concentrated aqueous solution of 1 mol of ammonia or a primary amine with a concentrated solution of 2 mols of a preformed di-(N-carbinol) urea, which term is intended to cover the simple dicarbinol derivatives of urea, such as dimethylol urea, and also the dicarbinol derivatives or substituted dicarbinol derivatives of urea and thiourea, or substituted ureas and thioureas represented by the formula

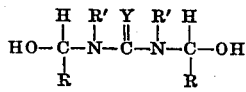

wherein, as previously indicated, Y represents oxygen or sulphur, R represents hydrogen or a monovalent aliphatic, carbocyclic or aromatic hydrocarbon radical of not more than six carbon atoms, and R' represents hydrogen or any monovalent hydrocarbon radical, examples of which are aliphatic (e. g. methyl, ethyl, propyl, osipropyl, butyl, secondary butyl, isobutyl, butenyl, amyl, isoamyl, hexyl, allyl, etc.) including cycloaliphatic (e. g. cyclopentyl, cyclopentenyl, cyclohexyl, cyclohexenyl, cycloheptyl, etc.); aryl (e. g. phenyl, diphenyl, naphthyl, etc.); alkaryl (e. g. tolyl, xylyl, ethylphenyl, propylphenyl, isopropylphenyl, etc.); and their homologues, as well as those groups with one or more of their hydrogen atoms substituted by a halogen. Specific examples of halogeno-substituted hydrocarbon radicals are chlorcyclohexyl, chlorphenyl, dichlorphenyl, ethyl chlorphenyl, phenylchlorethyl, bromethyl, bromtolyl, etc.

Examples of di-N-carbinol) ureas other than dimethylol urea previously mentioned are: dimethylol thiourea, methylol methylcarbinol urea and thiourea, di-(methylcarbinol) urea and thiourea, di-(propylcarbinol) urea and thiourea, dimethylol phenyl urea and thiourea, dimethylol allyl urea and thiourea, etc.

Preferably the novel di-(monocarbinolureidomethyl) amines are prepared by slowly adding a cold concentrated aqueous solution of ammonia or a primary amine to a cold concentrated aqueous solution of the desired di-(N-carbinol) urea in the ratio of 1 mol of ammonia or a primary amine to 2 mols of the di-carbinol urea at a temperature between 0° and —20° centigrade. The mixture is held within this temperature range during the course of the condensation reaction in which the two ingredients react as follows:

R''NH₂ + 2HOCHR—NR'—CY—NR'—CHROH ⟶

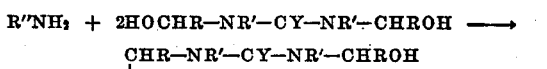

Thus one mol of ammonia reacts with two mols of dimethylol urea to form the simplest di-(monocarbinolureidomethyl) derivative, di-(monocarbinolureidomethyl) amine having the formula

The product of this reaction may be recovered by evaporation of the water at or below room temperature under atmospheric or subatmospheric pressures. Alternatively, the product may be recovered by adding to the aqueous solution of the reaction product a suitable water-miscible precipitant for the reaction product, which precipitant is incapable of reacting with the desired product at operating temperatures.

The compounds of the general formula

may be resinified under the influence of heat, the compound HN(CH₂NHCONH₂OH)₂ being most readily resinified under such conditions. The relative ease of resinification decreases with increased substitution of the various substitutable hydrogens by hydrocarbon radicals. Resinification may be accomplished by heating the compound alone, in an inert medium, or in an inert solvent such as water. Resinification may be accelerated by the addition of presence of basic materials, acidic materials, neutral, acid, or alkaline salts. Reactive media may likewise be used to achieve resinification as hereinafter shown.

These novel compounds may also be used as reactant catalysts in the preparation of synthetic resins from aldehyde and other aldehyde reactable inganic compounds, e. g. in the condensation of urea-formaldehyde, thiourea-formaldehyde, melamine-aldehyde, amino pyrimidine-aldehyde, guanazole-aldehyde, protein-aldehyde, phenol-formaldehyde, etc. By a reactant catalyst is meant a substance which will accelerate the condensation between the aldehyde and the aldehyde reactable body during the preparation of the resin while it itself becomes part of the resin. Since these compounds become part of the resins, the final resins strictly may be called aminoplast resins.

Being bases, the novel amines form salts with inorganic and organic acids such as hydrochloric, sulfuric, nitric, hydrofluoric, carbonic, formic, acetic, propionic, butyric, chloracetic, dichloracetic, benzoic, phthalic, cyclohexyl, carboxylic, oxalic, malonic, succinic, adipic, maleic, fumaric, citroconic, acrylic, methacrylic, atropic, polyacrylic, polymethacrylic acids, etc. These salts are extremely valuable in accelerating the conversion of the base compound

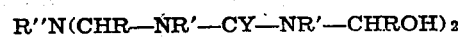

to a resinous state.

The salts of the novel class of compounds of this invention may be used as curing reactants for aminoplast and other resins such as urea-aldehyde resins, aminotriazine-aldehyde resins, etc. By a curing reactant is meant a compound which causes the curing or accelerates the curing of a resin and at the same time becomes an integral part of resin.

The novel class of crystalline preformed organic compounds may be mixed with resin intermediates containing carbinol (—CR₂OH) groups, such as monomethylol ureas, dimethylol ureas, phenol methylols, the methylols of cyclic amidines, e. g. melamine methylols, etc. and then co- or inter-resinified alone or in the presence of other modifying bodies to give intercondensed resins.

The novel compounds of this invention, particularly the highly substituted compounds, may be used as plasticizers for many resins. In many cases they themselves become resinous during the plasticizing process, while in other cases they condense with the other resinous intermediate during manufacturing operations. Specifically, these materials may be used (1) unconverted as plasticizers, (2) partly or completely converted as plasticizers, (3) partly or completely intercondensed to exert a plasticizing effect. The final and intermediate resins prepared from the novel materials of this invention alone or with the modifications expressed herein are extremely compatible with many other natural or synthetic resins in their intermediate or ultimate stages.

The novel base materials of this invention may be used to peptize or swell proteins, shellac, acid alkyd resins, etc., bringing them into solutions, or dispersions, or emulsions, or gels. Such composition may be "hardened" with or without the addition of aldehydes.

The compounds, alone or under catalytic influences as above expressed, will condense with many classes of compounds which form methylols and substituted methylols with formaldehyde, its polymers and homologues, for example with hydroxy compounds, e. g. methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl alcohols, etc.; glycol, diethylene glycol, triethylene glycol, polyethylene oxide, glycerine, pentaerythritol, saligenin, phenol, cresol, xylenol, resorcinol, catechol, pyrogallol, etc.; chlorohydrin, epichlorohydrin, nitrobutanol, diacetone alcohol, ethylene oxide, propylene oxide, etc.; ammonia and its amino, amido, or imino compounds, e. g. methylamine, dimethylamine, hydroxylamine, hydrazine, phenyl hydrazine, diamylamine, stearyl amine, cyclohexyl amine, aniline, di-phenylamine, diaminobenzene, triaminobenzene, aminophenol, nitro aniline piperazine, ethanolamine, di-isopropanolamine, triethanolamine, propanolamine, ethylene diamine, formamide, acetamide, propionamide, lauramide, acrylic amide, methacrylic amide, succinic diamide, citraconic triamide, benzamide, phthalic diamide, phthalimide, benzoyl sulfinimide, benzoyl sulfonylimide, aminobenzene sulfonylamide, benzene disulfonylamide, benzene trisulfonylamide, anthranilic esters, anthranilamide, salicylamide, para-phenyl benzene sulfonylamide, tolyl amide, etc.; the cyclic amidines such as the amino 1,3,5 triazines, e. g. 2,4,6 triamino 1,3,5-triazine, 2 - amino - 1,3,5 - triazine, 2,4-diamino-1,3,5-triazine; the diazines, e. g. 2,4,6 triaminopyrimidine, the diamino pyrimidine thio ethers; the amino-1,2,4-triazoles, e. g. guanazole, phenyl guanazole, dihydrazamido-1,2,4 pyrrodiazole, the amino 1,2 diazoles, e. g. 3,5 diaminopyrazole, guanazo - guanazole, imidurazo - guanazole, the urea type compounds, e. g. urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, dicyandiamide, guanyl urea, guanyl thiourea; the proteins, e. g. casein, soya bean protein, alfalfa protein gelatin, coffee bean protein, alkyd resins having free hydroxyl groups such as glyceryl phthalate, oil-modified glyceryl phthalate, diethylene glycol succinate, triethylene glycol maleate, glyceryl maleate, etc.; nitriles, e. g. acetonitrile, propionitrile, butyronitrile, benzonitrile, acrylonitrile, methacrylonitrile, atropic nitrile, ethylene cyanohydrin, acetone cyanohydrin, amino-isobutyronitrile, aminoacetonitrile, etc.; esters such as lactic esters, hydroxy isobutyric esters, acetoacetic esters, malonic esters, etc.

The novel compounds of this invention, alone or modified, will also form self-curing aminoplasts by condensation with curing reactants such as chloracetonitrile nitrourea, glycine, amino propanol hydrochloride, alpha beta dibrompropionitrile, mono-, di- or tri-chloracetamides, aminoacetamide hydrochloride, ethylene diamine monohydrochloride, sulfamic acid, chloracetyl urea, citric diamide, phenacyl chloride and others mentioned, for example, in my copending applications Serial No. 346,962, filed July 23, 1940, and Serial No. 354,395, filed August 27, 1940, both of which applications are assigned to the same assignee as the present invention.

The various ways in which my novel compounds may be used with or without the addition of various modifiers, in the preparation of resinous compositions will become apparent from the following examples illustrating how the principles of this invention are carried into effect.

Example 1

Evaporation of a 28% water solution of the compound $HN(CH_2NHCONHCH_2OH)_2$ to dryness by heating at 100° C. and heating the product at 125° C. produced a clear, colorless, thermoplastic resin that hardened upon cooling. The softening point of this resin was advanced by treatment with acids or intercondensing agents (e. g. citric acid, sulfamic acid, chloracetamide, glycine, etc.).

Example 2

By the progressive addition of various amounts of hydrochloric acid to a 28% water solution of $HN(CH_2NHCONHCH_2OH)_2$, solutions of the salt $HCl \cdot HN(CH_2NHCONHCH_2OH)_2$ either alone or in excess acid or solutions of mixtures of

and

were obtained. Heat treatment at 150° C. of the residue obtained by evaporating these solutions gave clear, colorless, hard, infusible resins.

Example 3

| | Parts by weight |
|---|---|
| Urea | 60 |
| Aqueous formaldehyde | 160 |
| $HN(CH_2NHCONHCH_2OH)_2$ | 6 | were heated together under reflux for 30 minutes to produce a resin syrup that was self-curing on the hot plate at 150° C. The cure was accelerated by the addition of acids or curing reactants. The syrup was used to make a molding compound by mixing 0.1 part chloracetamide with 23 parts syrup and refluxing for 10 minutes. Seven parts alpha flock and 0.04 part zinc stearate were added and the compound was dried at 70° C. for 3 hours. By molding at 130° C. and 2000 pounds per square inch pressure, a light-colored molded article possessing good cure was obtained.

Example 4

| | Parts by weight |
|---|---|
| Dimethylol urea | 30 |
| $HN(CH_2NHCONHCH_2OH)_2$ | 3 | were mixed in 35 parts water and the mixture heated under reflux for 30 minutes to produce a clear, colorless syrup having a pH of 7.2. Samples of this syrup were treated with acids, e. g. citric acid, etc., and curing reactants, e. g. chloracetamide, glycine, etc., on the hot plate at 150° C. and hard, infusible resins were obtained. The syrup was converted into a molding compound by heating 23 parts thereof with 0.1 part chloracetamide under reflux for 10 minutes and mixing the product with 7 parts alpha flock and 0.04 part zinc stearate. The resulting compound was dried for 3 hours at 70° C. and molded at 130° C. to produce a well-cured, light-colored article.

Example 5

| | Parts by weight |
|---|---|
| Aqueous trimethylol melamine (50% conc.) | 10 |
| Aqueous $HN(CH_2NHCONHCH_2OH)_2$ (28% conc.) | 18 | were heated together under reflux conditions for 15 minutes to produce a syrup having a pH of 8.05. When tested on the hot plate at 150° C. the resin converted to an infusible state. This conversion or cure was accelerated materially by the addition of acids or curing reactants. Twenty-five parts of the syrup were heated under reflux for 5 minutes with 0.1 part chloracetamide. Seven parts alpha flock and 0.04 part zinc stearate were added and the compound dried at 70° C. for 3 hours. A molded piece with excellent gloss, water resistance and cure was obtained by molding at a temperature of 130° C. and a pressure of 2000 pounds per square inch.

Example 6

| | Parts by weight |
|---|---|
| Butyl alcohol | 37 |
| $HN(CH_2NHCONHCH_2OH)_2$ in 10 parts $H_2O$ | 22 | were heated together under reflux for one hour. A clear, colorless syrup having a pH of 7.05 was formed. When concentrated by evaporation, the syrup yielded a very viscous resin. Samples of this resin were converted to a thermoset stage on the hot plate at 150° C. by the action of the previously mentioned acids and curing reactants. The resin was alcohol-soluble.

Example 7

| | Parts by weight |
|---|---|
| Diethyl malonate | 24.5 |
| $HN(CH_2NHCONHCH_2OH)_2$ in 10 parts $H_2O$ | 22.1 |
| NaOH in 0.5 part water | .1 | were mixed and heated under reflux for one hour, giving a clear syrup with a pH of 8.75. Concentration of the syrup left a clear, colorless, alcohol-soluble resin, films of which were bodied by simultaneous heat treatment and the action of certain acids and intercondensing agents to hard tough films.

Example 8

| | Parts by weight |
|---|---|
| Acetamide | 5.9 |
| Aqueous $HN(CH_2NHCONHCH_2OH)_2$ (28% conc.) | 80 | were mixed and refluxed for one hour. The product was a clear syrup from which an infusible resin was obtained when treated on the hot plate at 150° C. with the aforementioned acids and curing reactants.

Aldehyde-reactable compounds such as phenol, urea, melamine, etc. may be intercondensed along with the above components to produce heat-hardenable resins.

Example 9

| | Parts by weight |
|---|---|
| Melamine | 6.3 |
| Aqueous formaldehyde (approx. 37.1% H₂O) | 12.0 |
| Aqueous HN(CH₂NHCHCONH₂OH)₂ (28% conc.) | 3.6 | were heated together under reflux for 15 minutes. A clear, colorless syrup with a pH of 8.5 was obtained. The syrup yielded a self-curing resin, the cure of which was speeded by the inclusion of small amounts of an acid such as sulfamic acid or an intercondensing reactant, specifically chloracetamide.

The incorporation of the compound

HN(CH₂NHCONCH₂OH)₂ had the effect of increasing the plasticity or freedom of flow during the period of thermosetting. The above syrup was used in preparing a molding compound as follows: 23 parts of the syrup was mixed with 7 parts alpha flock and 0.04 part zinc stearate. The compound was dried at 70° C. for 3 hours. It exhibited good flow characteristics and when molded at 130° C. it produced a well-cured molded piece.

Example 10

The compound HN(CH₂NHCONHCH₂OH)₂ was used as an intercondensing alkaline agent in the preparation of a phenolic resin as follows:

| | Parts by weight |
|---|---|
| Phenol (synthetic) | 90 |
| Aqueous formaldehyde (approx. 37.1% CH₂O) | 195 |
| HN(CH₂NHCONHCH₂OH)₂ in 10 parts water | 2.8 | were mixed and refluxed for one hour. The treatment of the resulting syrup with acidic or basic agents on the hot plate at 150° C. produced heat-hardenable resins. The syrup was converted into a molding compound by adding 0.25 part of citric acid to 23 parts syrup and then mixing the acid-treated product with 7 parts alpha flock and 0.04 part zinc stearate. The compound was dried at 70° C. for 5 hours. A well-cured piece was obtained by molding the dried compound at 130° C.

Example 11

| | Parts by weight |
|---|---|
| Glycerine | 4.6 |
| Aqueous HN(CH₂NHCONCH₂OH)₂ (28%) | 80 | were mixed and refluxed for 30 minutes to yield a syrup with a pH of 7.5. The evaporation of this syrup at 125° C. produced a clear, colorless resin that bodied to a tough, hard resin by the combined action of heat (150° C.) and small additions of acids or curing reactants. The fusible intercondensation product may be used as a plasticizer for aminoplast resins.

Example 12

Eighteen parts of a 28% water solution of HN(CH₂NHCONHCH₂OH)₂ were heated under reflux for 30 minutes. Ten parts of a 50% aqueous solution of trimethylol melamine were added and reflux continued for 15 minutes. The resulting syrup had a pH of 7.95 and samples thereof yielded a cured resin when tested on the hot plate at 150° C. The addition of acids or intercondensing agents accelerated the cure. A molding compound was made by adding to 23 parts of the syrup, 7 parts alpha flock and 0.04 part zinc stearate. The compound was dried at 70° C. for 3 hours and molded at 130° C. A molded piece with excellent cure was obtained.

Example 13

A phenol-aldehyde resin varnish was compounded as follows:

| | Parts by weight |
|---|---|
| Phenol (82%) (12% orthocresol) | 180 |
| Aqueous formaldehyde (approx. 37.1% CH₂O) | 216 |
| Na₂CO₃·H₂O in 4.15 parts water | 1.8 |

The above ingredients were refluxed together for 30 minutes to yield a resin syrup with a pH of 8.8. The resin cured in 85 seconds on a hot plate at 150° C. The resin solids content of the syrup amounted to 53%.

Portions of the phenol-aldehyde varnish and of the compound HN(CH₂NHCONCH₂OH)₂ were mixed in the ratios of 9:1 and 1:9 based on the solid contents of the respective compositions. Samples of the two mixtures were tested on the hot plate for cure. The first, containing a major portion of the phenol-aldehyde varnish, had a cure time of 80 seconds. The second, containing a minor portion of the phenol-aldehyde varnish, cured to a hard, light-colored infusible mass.

Example 14

Example 13 was repeated but using, instead of the phenol-aldehyde varnish, a substantially anhydrous phenol-aldehyde resin that had been freed of all catalyzing bases and salts. This catalyst-resin had a hot plate cure at 160° C. of 135 seconds. The introduction of 10% by weight (on a solids basis) of HN(CH₂NHCONCH₂OH)₂ lowered this time to 105 seconds. Otherwise, the results were the same as those obtained in Example 13.

Example 15

A urea-formaldehyde resin varnish was prepared as follows:

| | Parts by weight |
|---|---|
| Urea | 60 |
| Aqueous formaldehyde (approx. 37.1% CH₂O) | 161 |
| Aqueous NH₃ (28%) | 6 |
| NaOH in 5 parts water | 0.1 |

These materials were heated together under reflux for 30 minutes.

To 18 parts of the varnish were added 3.6 parts of a 28% aqueous solution of

HN(CH₂NHCONHCH₂OH)₂

Reflux of the mixture for 30 minutes produced a syrup with a pH of 7.6. When tested on the hot plate at 150° C. with the addition of small amounts of acids or curing reactants infusible hard resins were obtained.

This syrup containing the product obtained by heating the urea resin with the carbinolureido derivative was made into a molding compound by adding 0.1 part chloracetamide to 23 parts of the syrup, refluxing the mixture for 10 minutes and adding 7 parts alpha flock and 0.04 part zinc stearate. The resulting compound was dried at 70° C. for 3 hours. A well-cured piece was obtained by molding at 130° C.

Example 16

To 23 parts of the urea-formaldehyde varnish of Example 15 were added 0.1 part of the salt HCl·HN(CH₂NHCONHCH₂OH)₂ and the mixture tested on the hot plate for cure. A self-curing resin was obtained.

Example 17

| | Parts by weight |
|---|---|
| Shellac | 50 |
| $HN(CH_2NHCONHCH_2OH)_2$ | 5 | were intimately mixed. The mixture cured rapidly to an infusible hard resin at 150° C. This mixture may be used as mica binding.

Example 18

| | Parts by weight |
|---|---|
| Alkyd resin (glyceryl phthalate) | 50 |
| $HN(CH_2NHCONCH_2OH)_2$ | 5 | were mixed and fused together at 150° C. to produce a thermosetting resin useful as a mica binder.

Example 19

| | Parts by weight |
|---|---|
| Aqueous $HN(CH_2NHCONHCH_2OH)_2$ (28% conc.) | 16 |
| Polyvinyl alcohol in 5 parts water | 5.3 | were mixed and heated under reflux for 15 minutes. A clear, colorless viscous syrup with a pH of 7.05 was obtained. The conversion of this syrup to a bodied resin could be controlled by adjusting the pH of the syrup. Films obtained by baking samples at moderately low temperatures were transparent and tough.

Example 20

| | Parts by weight |
|---|---|
| Aqueous $HN(CH_2NHCONHCH_2OH)_2$ (28% conc.) | 80 |
| Para toluene sulfonamide | 17 |
| Aqueous formaldehyde (approx. 37.1% $CH_2O$) | 8 | were mixed and refluxed for 15 minutes to produce a precipitated clear viscous resin. This resin was soluble in Solvatone. At 150° C. the resin cured slowly by itself. The addition of acids or curing reactants accelerated this cure.

Example 21

Various potential self-curing aminoplasts were produced by condensing $$HN(CH_2NHCONHCH_2OH)_2$$

with small quantities of various curing reactants. Chloracetamide, trichloracetamide, glycine, nitrourea, phenacyl chloride, chloracetonitrile, alpha beta dibromopropionitrile, citric acid diamide and polysalicylide were observed to give self-curing aminoplasts. Paraform may also be used in conjunction with the $$HN(CH_2NHCONHCH_2OH)_2$$

and the intercondensing agent to produce self-curing resins.

Example 22

A water solution of the compound

obtained by reacting 1 mol butyl amine with 2 mols dimethylourea was concentrated at 100–130° C. A clear colorless resin was obtained.

Example 23

| | Parts by weight |
|---|---|
|  in 20 parts water | 23.5 |
| Aqueous formaldehyde (approx. 37.1% $CH_2O$) | 8.1 |
| Aqueous ammonia (28%) | 0.2 | were mixed and heated under reflux for 45 minutes to yield a clear resin syrup. On tests with various agents (e. g. citric acid, sulfamic acid, chloracetamide, glycine, etc.) at 140° C. on a hot plate the syrup became self-curing (heat-curable) and produced an infusible resin.

This resin syrup may be employed as a baking enamel to produce a tough, hard surface coating. In addition, with an inert filler, coloring matter, and a lubricant, molding compositions may be compounded therefrom.

Example 24

| | Parts by weight |
|---|---|
|  in 20 parts water | 23.5 |
| Urea | 6.0 |
| Aqueous formaldehyde (approx. 37.1% $CH_2O$) | 8.1 |
| Aqueous ammonia (28%) | 0.3 | were reacted together at reflux temperature for 45 minutes. The viscous syrup so produced was clear and at 140° C. bodied to a transparent soft mass. With curing agents or reactants or chloracetamide the syrup yielded heat-cured infusible resins at the above temperature.

Twenty-one parts syrup were mixed with 0.2 part chloracetamide and heated under reflux for 30 minutes (or till incipient precipitation caused cloudiness). Seven parts alpha flock and 0.04 part zinc stearate were added and the wet compound dried at 70° C. for 4 hours. The compound exhibited very good flow when molded at 130° C. under 2000 lbs./sq. in. pressure. The molded piece possessed an attractive appearance and a good cure.

In producing these various condensation products dyes, pigments, plasticizer, mold lubricants, opacifiers, and various fillers (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used, as has been shown, as modifiers of other natural and synthetic resins, as laminating varnishes in the production of laminated articles wherein sheet materials, e. g. paper, cloth, sheet asbestos, etc. are coated and impregnated with the resin, superimposed and thereafter united under heat and pressure. They may also be used as modifiers of, or may be modified by, the synthetic compositions disclosed in various copending applications of mine, for example in copending applications Serial Nos. 409,017; 409,018; 409,020; 409,021; and 409,022, filed concurrently herewith and assigned to the same assignee as the present invention. More specifically, the compositions of this invention may be used in the form of mixtures with condensation products of preformed substituted or unsubstituted mono-, di-, or tri-(carbamidomethyl) amines and aldehydes, or condensation products of substituted or unsubstituted mono- or tri-(monocarbinolureidomethyl) amines, or with two or more of such condensation products. They may be used in the production of wire or baking enamels, for bonding or cementing together mica flakes to form a laminated mica article, for bonding together abrasive grains in the production of resin-bonded abrasive articles such for instance as grindstones, sandpapers, etc. They also may be employed for treating cotton, linen, and other cellulosic materials in sheet or other form. They also may be used as impregnants for electrical coils and for other electrically insulating applications.

What I claim as new and desire to secure by Letters Patent of the United States is:

1. A composition of matter comprising the condensation product obtained by heating an organic compound of the formula

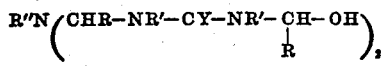

where Y represents oxygen, R represents a member of the class consisting of hydrogen and any monovalent hydrocarbon radical of not more than six carbon atoms, R' represents a member of the class consisting of hydrogen, monovalent hydrocarbon and halogeno-substituted hydrocarbon radicals, and R'' represents a monovalent hydrocarbon radical.

2. A composition of matter comprising the reaction product of (1) an organic compound of the formula

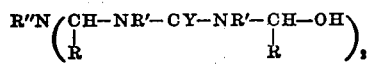

where Y represents oxygen, R represents a member of the class consisting of hydrogen and any monovalent hydrocarbon radical of not more than six carbon atoms, R' represents a member of the class consisting of hydrogen, monovalent hydrocarbon and halogeno-substituted hydrocarbon radicals, and R'' represents a monovalent hydrocarbon radical and (2) a reaction product of an aldehyde and an aldehyde-reactable organic compound capable of forming methylol derivatives on reaction with formaldehyde.

3. A composition of matter comprising the reaction product of (1) an organic compound of the formula

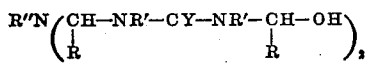

where Y represents oxygen, R represents a member of the class consisting of hydrogen and any monovalent hydrocarbon radical of not more than six carbon atoms, R' represents a member of the class consisting of hydrogen, monovalent hydrocarbon and halogeno-substituted hydrocarbon radicals, and R'' represents a monovalent hydrocarbon radical and (2) a resin intermediate containing methylol groups.

4. A composition as in claim 2 wherein the aldehyde-reactable organic compound is urea.

5. A composition of matter comprising the reaction product of (1) an organic compound of the formula

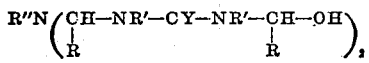

where Y represents oxygen, R represents a member of the class consisting of hydrogen and any monovalent hydrocarbon radical of not more than six carbon atoms, R' represents a member of the class consisting of hydrogen, monovalent hydrocarbon and halogeno-substituted hydrocarbon radicals, and R'' represents a monovalent hydrocarbon radical, and (2) the reaction product of an aldehyde and a cyclic amidine having at least one hydrogen atom attached to the amino nitrogen.

6. A composition of matter comprising the heat convertible product of reaction of (1) a partial condensation product obtained by heating an organic compound of the formula

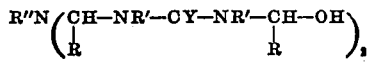

where Y represents oxygen, R represents a member of the class consisting of hydrogen and any monovalent hydrocarbon radical of not more than six carbon atoms, R' represents a member of the class consisting of hydrogen, monovalent hydrocarbon and halogeno-substituted hydrocarbon radicals, and R'' represents a monovalent hydrocarbon radical and (2) a chlorinated acetamide in the presence of dimethylol urea.

7. A product comprising the heat-cured composition of claim 5.

8. A composition as in claim 1 wherein the reaction-product is an alcohol-modified product of the stated component.

9. A composition comprising the product of reaction of polyvinyl alcohol and an organic compound of the formula

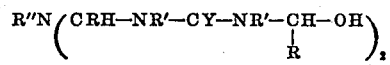

where Y represents oxygen, R represents a member of the class consisting of hydrogen and any monovalent hydrocarbon radical of not more than six carbon atoms, R' represents a member of the class consisting of hydrogen, monovalent hydrocarbon and halogeno-substituted hydrocarbon radicals, and R'' represents a monovalent hydrocarbon radical.

10. The method of preparing new condensation products which comprises heating an organic compound of the formula

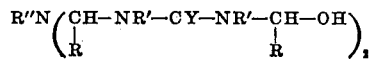

wherein Y is a member of the class consisting of oxygen and sulphur, R is a member of the class consisting of hydrogen and monovalent hydrocarbon radicals of not more than six carbon atoms, and R' represents a member of the class consisting of hydrogen, monovalent hydrocarbon radicals, and halogeno-substituted hydrocarbon radicals, and R'' represents a monovalent hydrocarbon radical.

11. A composition as in claim 2 wherein the aldehyde-reactable organic compound is melamine.

12. A composition as in claim 2 wherein the aldehyde is formaldehyde and the aldehyde-reactable organic compound is urea.

GAETANO F. D'ALELIO.